United States Patent [19]

Sridhar

[11] 4,411,857
[45] Oct. 25, 1983

[54] NUCLEAR REACTOR CONTROL APPARATUS

[75] Inventor: Bettadapur N. Sridhar, Cupertino, Calif.

[73] Assignee: The United States of America as represented by the U.S. Department of Energy, Washington, D. C.

[21] Appl. No.: 254,709

[22] Filed: Apr. 16, 1981

[51] Int. Cl.³ .............................................. G21C 7/08
[52] U.S. Cl. .................................... 376/233; 376/238
[58] Field of Search ............... 376/228, 229, 233, 238, 376/234

[56] References Cited

U.S. PATENT DOCUMENTS

| | | | |
|---|---|---|---|
| 2,894,779 | 7/1959 | Kushner et al. | 376/233 |
| 3,448,006 | 6/1969 | Fortescue et al. | 376/233 |
| 3,715,269 | 2/1973 | Mehren | 376/233 |
| 3,762,994 | 10/1973 | Kunzel | 376/234 |
| 3,905,634 | 9/1975 | Johnson et al. | 376/233 |
| 3,941,413 | 3/1976 | Johnson et al. | 376/233 |
| 4,124,442 | 11/1978 | Zhuchkov et al. | 376/233 |
| 4,181,569 | 1/1980 | Ingham | 376/238 |

OTHER PUBLICATIONS

"Fast Reactor Technology: Plant Design," M.I.T. Press (1966) Yevick et al., pp. 626–627.

Primary Examiner—Sal Cangialosi
Attorney, Agent, or Firm—Edwin D. Grant; Stephen D. Hamel; Richard G. Besha

[57] ABSTRACT

Nuclear reactor safety rod release apparatus comprises a ring which carries detents normally positioned in an annular recess in outer side of the rod, the ring being held against the lower end of a drive shaft by magnetic force exerted by a solenoid carried by the drive shaft. When the solenoid is de-energized, the detent-carrying ring drops until the detents contact a cam surface associated with the lower end of the drive shaft, at which point the detents are cammed out of the recess in the safety rod to release the rod from the drive shaft. In preferred embodiments of the invention, an additional latch is provided to release a lower portion of a safety rod under conditions that may interfere with movement of the entire rod.

8 Claims, 2 Drawing Figures

NUCLEAR REACTOR CONTROL APPARATUS

This invention, which was made under a contract with the U.S. Department of Energy, relates to nuclear reactor control apparatus and, more particularly, to apparatus for quickly releasing a shaft carrying a neutron-absorbing material which is inserted into a nuclear reactor core to control fission therein.

BACKGROUND OF THE INVENTION

Complete shutdown of the operation of a nuclear reactor, commonly referred to as a scram, is required under any condition wherein continued operation could cause damage to the reactor. A scram is generally effected by releasing vertically disposed "safety" rods carrying neutron-absorbing material at their lower ends, thus allowing the rods to drop to a level wherein they position the absorber material within the reactor core. The inertia of long safety rods limits the speed at which they can be moved to scram position. Furthermore, it is possible that seismic shocks can interfere with the release of absorber carrying rods by bending them so that they cannot slide in their bearings. All scram control mechanisms must, of course, provide a means for returning safety rods to their raised position when an adverse operating condition has been eliminated.

As shown in the description of scram mechanisms presented in the text titled "Fast Reactor Technology: Plant Design", published by M.I.T. Press in 1966, electromagnets have previously been used to hold reactor safety rods in a raised position until an unsafe reactor operating condition occurs, at which time the electromagnets are de-energized to release the rods. An electromagnet is incorporated in some latch mechanisms of embodiments of the invention disclosed herein, but the construction of safety rod release apparatus in accordance with the invention differs from that of known devices. Furthermore, known safety rod release devices use only one release means, whereas in preferred embodiments of this invention a plurality of release latches provide for two types of scram.

SUMMARY OF THE INVENTION

It is an object of this invention to provide an improved means for rapidly inserting a neutron absorber into a nuclear reactor core to control fission therein.

Another object of the invention is to provide a nuclear reactor control apparatus having (1) plural latch assemblies for quickly releasing, under different conditions, a shaft which carries a neutron absorber, and (2) an additional lead screw drive means for moving the absorber into and out of a reactor core.

A major difference between preferred embodiments of this invention and known apparatus for shutting down a nuclear reactor is that in the latter there is a single release mechanism that is actuated to permit a safety rod to move downwardly and thereby position a neutron absorber within a reactor core, whereas the invention provides (1) a first release mechanism that operates to drop an entire safety rod, and (2) a second release mechanism that operates to separate from the lower end of the safety rod a small segment thereof that holds the neutron absorber. The entire safety rod is released when a condition occurs that cannot affect the lowering of the rod, such as, for example, the failure of a coolant pump. However, when a condition occurs that may affect the movement of the entire safety rod (such as an earthquake), the absorber-holding segment is released from the lower end of the safety rod and allowed to move within the reactor core. The long safety rod could be bent by seismic shock and thus jammed in a position wherein the neutron absorber is held outside the reactor core. The small absorber holding segment of the rod will not be affected by seismic shock and, in addition, it can be moved more rapidly within the reactor core than the entire safety rod because its inertia is much less than that of the rod.

Another advantage of using a plurality of release mechanisms is that the position of the safety rod can be detected during a scram of the entire safety rod (normal scram) using known types of position sensors such as reed switches and magnets.

DESCRIPTION OF THE PREFERRED EMBODIMENT

Figure 1:
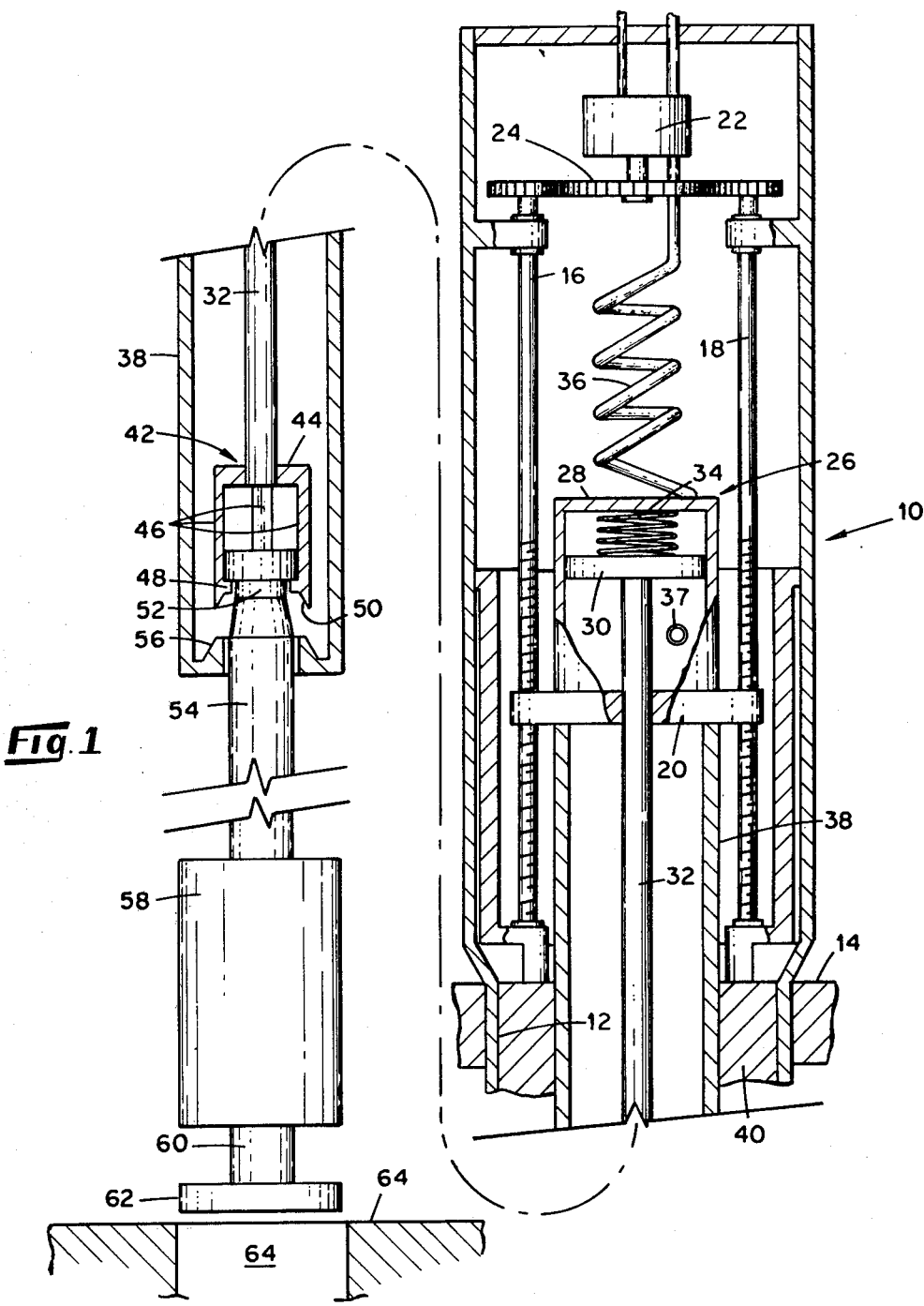
FIG. 1 is a schematic representation of a first preferred embodiment of the invention, wherein certain components are segmented and broken away for clarity.

In FIG. 1 reference number 10 generally designates an actuator housing that extends through an aperture 12 in the cover 14 of the containment vessel of a nuclear reactor, this housing projecting upwardly from the cover and having mounted herein a pair of vertically disposed lead screws 16, 18 that are respectively threadedly engaged in apertures in a carriage 20. Lead screws 16, 18 are connected to an electric motor 22 by gearing 24. Reference number 26 generally designates a piston-cylinder type ram the housing 28 of which is mounted on carriage 20 and the piston 30 of which is connected to a vertically disposed control rod 32 slidably fitted in an aperture in the carriage. A coil-type spring 34 is located between piston 30 and the top cover of housing 28, and a conduit 36 connects a source of pressurized fluid with the space in the housing below piston 30 through an inlet 37 in the housing wall.

Concentrically disposed around control rod 32 is a tubular drive shaft 38 the upper end of which is fixedly secured to carriage 20. Drive shaft 38 is slidably positioned in a central aperture in a seal plug 40 fitted in housing 10, and in the illustrated configuration of the described apparatus the lower end of the drive shaft is disposed adjacent a latch generally designated by reference number 42. This latch 42 comprises the following parts: (1) a disk-shaped latch base 44 formed with a central aperture in which the lower end of rod 32 is fixed; (2) a plurality of elongate, downwardly projecting elements 46 (referred to hereinafter as fingers) which are integrally attached to base 44 at points evenly spaced about the periphery thereof; (3) lugs 48 (referred to hereinafter as detent elements) which are respectively integrally formed on the lower ends of fingers 46 and which project radially from the fingers toward the common longitudinal axis of control rod 32 and drive shaft 38; and (4) first cam elements 50 which are also respectively integrally formed on the lower ends of fingers 46 and project downwardly from detent elements 48, each cam element having a cam surface disposed oblique to the longitudinal axis of drive shaft 38.

In the illustrated configuration of the described apparatus, detent elements 48 are positioned in a recess 52 formed in the outer side surface of a vertically disposed shaft 54 at the upper end thereof, the detents abutting the horizontally extending shoulder at the upper end of said recess. At the lower end of drive 38 is a second annular cam element 56 which projects inwardly from the wall of the drive shaft and which comprises a cam surface disposed oblique to the longitudinal axis of the drive shaft. An assembly 58 containing material that captures neutrons is attached to the lower end of shaft 54, which assembly will be referred to hereinafter as the absorber. A shaft 60 depends from this absorber and supports a disk-shaped piston 62 at its lower end. In the illustrated configuration of the described components, absorber 58 is positioned above a nuclear reactor core 64 having an aperture 66 therein.

Figure 2:
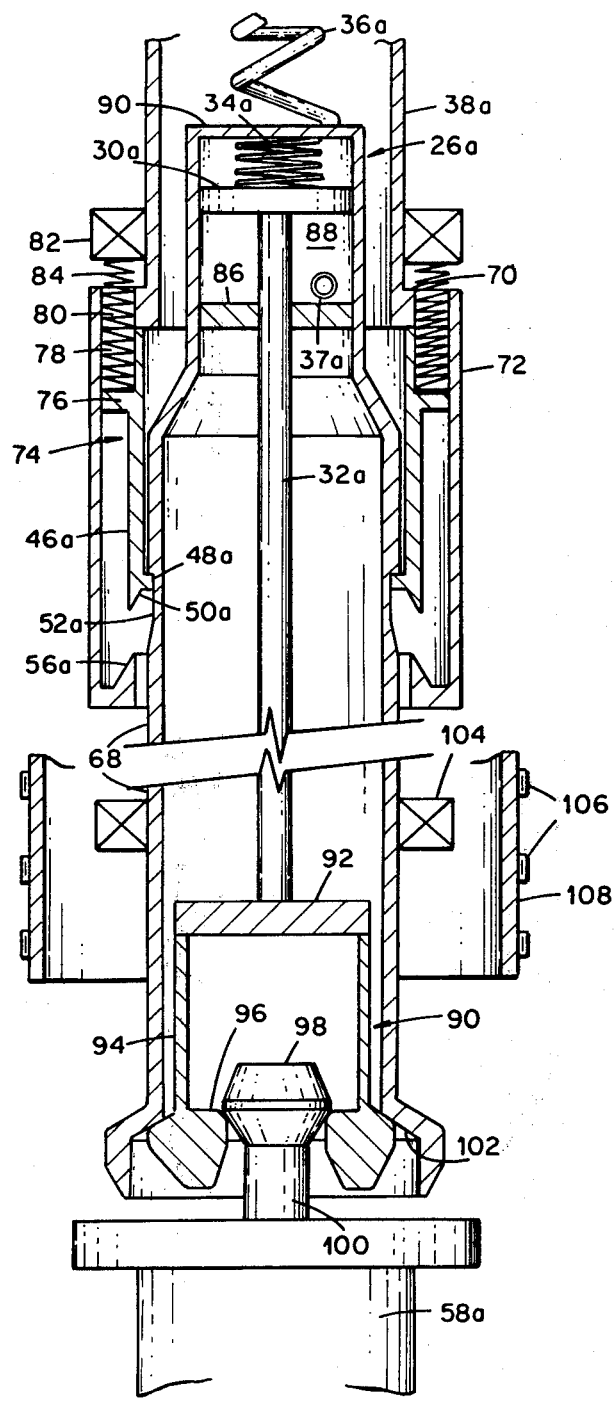
FIG. 2 is a schematic representation of a second preferred embodiment of the invention, wherein certain components are also segmented and broken away for clarity and other components which are identical to parts shown in FIG. 1 are omitted.

A second embodiment of the invention that is illustrated in FIG. 2 includes a vertically disposed drive shaft 38a connected at its upper end to a carriage of the type designated by reference number 20 in FIG. 1, the carriage being mounted on lead screws 16, 18 connected to a motor 22 as shown in the last-mentioned drawing. The two latch mechanisms that are included in the second embodiment of the invention differ however, from the latch mechanism used in the FIG. 1 embodiment. In the configuration of components illustrated in FIG. 2, the upper end of a vertically disposed, tubular shaft 68 is inserted into the lower end of drive shaft 38a, the upper end of shaft 68 having a reduced diameter so that it releasably fits inside the drive shaft. A flange 70 projects outwardly from the lower end of drive shaft 38a, and a sleeve 72 extends downwardly from the periphery of this flange. Reference number 74 generally designates a first latch comprising a ring 76 the outer side surface of which slidably confronts the inner surface of sleeve 72 and the top surface of which abuts the lower end of drive shaft 38a in the illustrated arrangement of the components. Holes 78 are evenly spaced around the upper surface of ring 76, these holes extending only partially through the ring and being respectively aligned with apertures 80 that extend through flange 70 on drive shaft 38a. A solenoid 82 is mounted around drive shaft 38a adjacent flange 70, and coil-type springs 84 are respectively positioned in holes 78 in ring 76 and apertures 80 in flange 70 with their lower ends engaged with the bottom surfaces of holes 78 and their upper ends engaged with the lower surface of the solenoid.

Attached to ring 76 of latch 74 are fingers 46a, detent elements 48a, and first cam elements 50a that are identical to components 46, 48, and 50 of latch 42 illustrated in FIG. 1 and described hereinbefore. Shaft 68 is provided with a recess 52a corresponding to recess 52 depicted in FIG. 1, and in FIG. 2 detent elements 48a of latch 74 are positioned in this recess. Integrally formed on the lower end of sleeve 72 is a second annular cam element 56a identical to cam element 56 in the FIG. 1 embodiment.

At the upper end of shaft 68 is a ram 26a having the same type of construction as ram 26 of FIG. 1. A partition 86 in the upper interior portion of shaft 68 forms a chamber 88 in which a piston 30a is slidably situated and a control rod 32a is connected to the piston and slidably engaged in an aperture in the partition. Piston 30a and control rod 32a are biased downwardly by a coil-type spring 34a held between the piston and an end wall 90 on shaft 68. Duplication of the components of ram 26 of the FIG. 1 embodiment of the invention is completed by a conduit 36a that connects a source of pressurized fluid with the space in chamber 88 below piston 30a through an inlet 37a.

The lower end of control rod 32a is attached to a second latch generally designated by reference number 90. Like latch 42 of the FIG. 1 embodiment of the invention, latch 90 includes a disk-shaped latch base 92 and a plurality of elongate downwardly projecting elements 94 (referred to hereinafter as fingers) which are integrally attached to the base at points evenly spaced about the periphery thereof. The lower end of each finger 94 has a bulbous gripping element 96 integrally formed thereon. In the illustrated configuration of the latch components, the inner surfaces of gripping elements 96 abut the enlarged end 98 of a short shaft 100 that supports a neutron absorber 58a, and the outer surfaces of the gripping elements abut the inner surface of a cam lip 102 diverging outwardly from shaft 68 at the lower end thereof. Fingers 94 are arranged so that they will spread away from the longitudinal axis of shaft 68 when latch 90 is moved downwardly by control rod 32a and gripping elements 96 are allowed to slide downwardly along the outwardly diverging inner surface of cam lip 102. A permanent magnet 104 mounted on shaft 68 tracks the safety rod by actuating reed switches 106 mounted on a tube 108 located outside the shaft. This position detection is possible only during scrams when the entire safety rod translates.

OPERATION OF PREFERRED EMBODIMENT

As will be understood from the previous description, when drive shaft 38 and control rod 32 of the first-described embodiment of the invention are positioned as illustrated in FIG. 1, the neutron absorber 58 on the end of shaft 54 is held above the nuclear reactor core 64. If a condition developes that requires shutdown of the reactor, pressuring fluid in housing 28 below piston 30 is released through conduit 36. Spring 34 then forces piston 30 and control rod 32 connected thereto downwardly, which moves first cam elements 50 on the fingers 46 of latch 42 into engagement with the second cam element 56 on the end of drive shaft 38. Since the oblique camming surface on cam element 56 is spaced farther from the longitudinal axis of drive shaft 38 than the oblique camming surface on each of the cam elements 50, the lower ends of fingers 46 are flexed away from shaft 54 and the detent elements 48 on the fingers are moved out of the recess 52 on the last-mentioned shaft. Shaft 54 is thus allowed to move downwardly to a level wherein absorber 58 carried by the shaft is positioned within core 64. As will be recognized by persons familiar with the design of nuclear reactors, pressure can be applied to piston 62 to assist the force of gravity in moving absorber 58 downwardly when the reactor must be scrammed.

Retrieval of shaft 54 and absorber 58 from their lowered position is effected by operating motor 22 to rotate lead screws 16, 18 in the direction which lowers carriage 20 and drive shaft 38 mounted thereon to a position where the lower end of the drive shaft is disposed around the upper end of shaft 54 and cam elements 56 are positioned relative to recess 52 in shaft 54 as illustrated in FIG. 1. Fluid is then forced into housing 28 below piston 30 to drive the piston upwardly in the housing. This movement of piston 30 lists cam elements 50 upwardly from cam element 56 and fingers 46 spring back to the position wherein detent elements 48 are disposed in recess 52 in shaft 54. Lead screws 16, 18 are then rotated by motor 22 in the direction which raises drive shaft 38 and shaft 54 to the position thereof that is illustrated in FIG. 1.

The apparatus illustrated in FIG. 2 provides for insertion of absorber 58a into a reactor core under different conditions. During normal operation of the reactor with which the apparatus is associated electric current flows through solenoid 82 and the magnetic field of the solenoid holds ring 76 of latch 74 against the flange 70 at the lower end of drive shaft 38a so that shaft 68 and absorber 58a are held in raised position. If a non-seismic event occurs that requires insertion of absorber 58a into the reactor core, flow of electric current through solenoid 82 is terminated. Latch 74 is then pulled downwardly by shaft 68 and absorber 58a, and when cam elements 50a are cammed away from the shaft by cam element 56a, the shaft and absorber are released from the latch. Conduit 36a is in the form of an extensible coil and thus it does not interfere with movement of shaft 68. However, if a seismic event occurs, it is advantageous, for the reasons presented hereinbefore, to release absorber 58a from shaft 68. This can be accomplished by releasing pressurizing fluid from chamber 88 below piston 30a in the upper portion of shaft 68, whereupon spring 34a forces the piston and control rod 32a downwardly and gripping elements 96 move away from, and release, the bulbous upper end of shaft 100.

To recover shaft 68 and absorber 58a when shaft 68 has been released, the carriage 20 connected to the upper end of drive shaft 38a is moved downwardly by lead screws 16, 18 until sleeve 72 is positioned around the upper end of shaft 68 as illustrated in FIG. 2. Springs 76 maintain cam elements 50a against cam element 56a while drive shaft 38a is being lowered. Ring 76 of latch 74 is then lifted against flange 70 on the lower end of drive shaft 38a by passing electric current through solenoid 82, which enables detent elements 48a to spring into recess 52a on shaft 68. Lead screws 16, 18 are then rotated to raise carriage 20 and the absorber support assembly.

When absorber 58a has been released from shaft 68 to shut down the reactor during a seismic disturbance, carriage 20 is lowered to bring cam lip 102 at the lower end of shaft 68 around the enlargement on shaft 100. Then pressurizing fluid is forced into chamber 88 below piston 30a to lift latch 90, which engages cam elements 96 with the end of shaft 100, absorber assembly attached thereto.

What is claimed is:

1. Apparatus for controlling fission in a nuclear reactor, comprising:
   a vertically disposed shaft mounted for reciprocation along its longitudinal axis;
   coupling means for releasably supporting a neutron absorber at the lower end of said shaft, said absorber being held by said shaft above the core of said reactor when said shaft is in a raised position, said absorber being located within said core when said shaft is in a lowered position;
   means for holding said shaft in said raised position thereof until a first non-seismic condition occurs that may affect safe operation of said reactor, and for releasing said shaft for displacement to said lowered position thereof upon the occurrence of said first condition; and
   means for releasing said coupling means when a second seismic condition occurs that may affect safe operation of said reactor.

2. Apparatus for controlling fission in a nuclear reactor core, comprising:
   a vertically disposed shaft carrying a neutron absorber and mounted for longitudinal reciprocation between a raised position wherein it holds the absorber above the reactor core and a lowered position wherein it locates the absorber within the reactor core, said shaft having a recess in its outer side surface;
   a latch disposed adjacent the outer side of said shaft and movable between a raised shaft holding position and a lowered shaft releasing position, said latch comprising (1) a detent element movable toward and away from said shaft, said detent element being positioned in the recess in said shaft when said latch is in its shaft-holding position to thereby prevent movement of the shaft to its lowered position, and (2) a first cam element projecting below said detent element; and
   a second cam element spaced below said latch when the latter is in its shaft-holding position, said second cam element being arranged so that when said latch moves to its shaft-releasing position, it engages said first cam element and moves said detent element out of the recess in said shaft, whereby the shaft is allowed to move to its lowered position.

3. The apparatus of claim 1 including:
   a vertically movable carriage supporting said second cam element; and
   a piston-cylinder ram mounted on said carriage and provided with a vertically disposed control rod carrying said latch at its lower end.

4. The apparatus of claim 2 including:
   a tubular drive shaft concentrically disposed around said shaft and mounted for longitudinal reciprocation, said second cam element being fixedly connected to the lower end of said drive shaft;
   magnetic means for releasably holding said latch against the lower end of said drive shaft; and
   spring means for forcing said latch toward said second cam element when said latch is released from said drive shaft.

5. The apparatus of claim 4 wherein said magnetic means comprises a solenoid.

6. The apparatus of claim 5 wherein said solenoid is mounted on said drive shaft.

7. The apparatus of claim 2 wherein said latch comprises (1) a ring disposed around said shaft, and (2) an elongate, flexible element depending from said ring and supporting said detent element and said first cam element at its lower end.

8. The apparatus of claim 2 including:
   a holder for said neutron absorber disposed below said shaft; and
   means at the lower end of said shaft for releasably gripping said holder.

* * * * *